Figure 2:
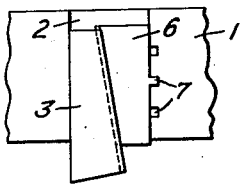

April 14, 1936.  H. F. SCRIBNER  2,037,642

BLADE LOCK FOR METAL CUTTING TOOLS

Filed Sept. 28, 1933  2 Sheets-Sheet 1

INVENTOR-
Harold F. Scribner
BY
Nathan, Bowman + Helferich
ATTORNEYS

April 14, 1936.   H. F. SCRIBNER   2,037,642
BLADE LOCK FOR METAL CUTTING TOOLS
Filed Sept. 28, 1933   2 Sheets-Sheet 2

INVENTOR-
Harold F. Scribner
BY
Nathan, Barman + Helferich
ATTORNEYS

Patented Apr. 14, 1936

2,037,642

UNITED STATES PATENT OFFICE 2,037,642

BLADE LOCK FOR METAL CUTTING TOOLS

Harold F. Scribner, Westfield, N. J., assignor to The O. K. Tool Company, Inc., New York, N. Y., a corporation of New York Application September 28, 1933, Serial No. 691,281
In Great Britain September 29, 1932

2 Claims. (Cl. 29—105)

The present invention relates to improvements in means for locking the blade or blades of inserted blade cutting tools firmly and securely in the body holder or member. It has for its primary object to provide a blade lock for the blades of a cutting tool such as rotary cutter or lathe tool in such manner as to eliminate auxiliary locking devices, e. g., pins, set screws, etc., and their attendant disadvantages without a sacrifice to strength or rigidity in the assembled tool.

A further object of this invention is to provide a blade lock for tools in such manner that the direct effect of the cutting forces is to more firmly seat the blades in the holder and thus eliminate any tendency of the blades to work loose under load.

In the attainment of these objects it has been found expedient and most practicable to employ the principle of the wedge to hold the blade in place.

Rotary cutting tools, such as, for example, a milling cutter, must, of course, be constructed so as to withstand tremendous loads and with the advent of the modern alloy steels and faster machining methods, the problems of constructing cutters strong enough to meet the demand, presented serious questions to the cutter builder.

For some time past it was found that the expense of cutting or manufacturing a complete rotary cutter from the solid was prohibitive and also that certain of the newer alloy steels such as "stellite" could be effectively machined only by a grinding operation.

Furthermore, no need exists for forming the entire cutter of such high grade steels and it is more desirable that certain portions of the cutter possess different characteristics in accordance with the function to be performed thereby, e. g. the cutting points or teeth should be extremely hard, durable, and remain unaffected by high temperatures while the body portion of the cutter should be somewhat softer but tough, strong and non-brittle.

Heretofore, various forms of locking devices involving locking pins, set screws and various other kinds of complicated devices have been employed to clamp the blades in position. Each of these devices has disadvantages and limitations in that the additional holes or apertures formed in the cutter to accommodate the particular clamping device appreciably weakened the entire cutter and thus limited its use. In addition the blades clamped by the prior devices displayed a tendency to work loose, or that the number of separate parts necessary for the clamp were not only expensive to manufacture but impaired the rigidity and solidness of the completely assembled tool which is so essential in tools of this character.

This invention overcomes the undesirable features of the prior blade locks by employing the principles of the wedge to arrive at a more firm and solid lock between the blade and the body member, the tapers formed upon the parts, whether a single taper or, a double taper, extending in a direction such that the normal action of the tooling forces, or the component of several forces, upon the blade tends more firmly to drive the blade in its seat.

This invention has for a further aim to design the several parts so that the blade member be capable of readjustment when reground, in one or two directions with respect to the cutting edges thereof, independently or in two directions simultaneously, depending, of course, upon the manner of functioning of the particular tool and the nature of the work or operation for which it is used.

In carrying out the objects of this invention it is proposed to construct a body member having a blade opening or aperture formed therein of such shape and size as to conform in general to the shape and size of the unit to be inserted therein. The insertable unit itself may be constructed of one or more pieces according to its intended usages and range of adjustments required. That is to say, the unit may comprise but a single member namely the blade, which is tapered in a manner to fit the opening in the holder or it may comprise two members, a blade member proper and a locking member, the two together forming a unit of a shape adaptable for insertion in the opening in the body member. If the blade opening is tapered in one or more directions the blade or the blade and locking member will likewise be tapered in conformity therewith. In the case of the composite unit construction either the blade or the locking member may separately have the required taper or tapers formed thereon or both may be tapered in such a way that the two elements together conform to the shape of the opening, whether the opening be substantially rectangular in form, or tapered in one or more directions.

To effect adjustments or repositioning of the blade with respect to the holder in transverse directions either singly or compoundly it is proposed to provide interengaging devices, such as serrations and/or ribs and grooves upon the several members adapted to interengage each other to form a positive interlock therebetween in any one of several adjusted positions. To effect readjustment of the blade in the holder, the blade is removed therefrom and stepped over one or more serrations or grooves, the width of the spaces intervening the serrations or grooves and the angle of inclination thereof being the primary factors determining the degree of change in size.

Figure 4:
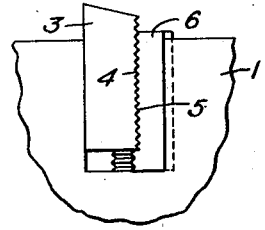
Figure 1:
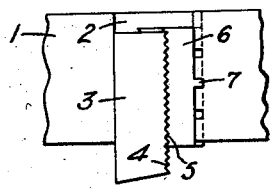
Figure 3:
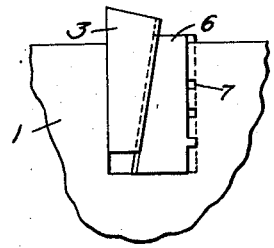
Figure 6:
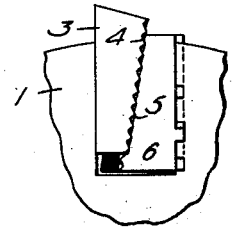
Figure 5:
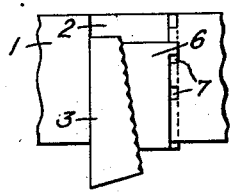

How the foregoing objects and results may be obtained in practice will be explained in detail in connection with the accompanying drawings in which Figures 1 and 2 are fragmentary detail views of a rotary cutter of the slotting type, while Figs. 3 and 4 are similar views of a cutter of the side or face mill type, both illustrating a single tapered blade member, the taper of which extends in the direction of the greatest tooling force, that is, so that the normal tendency thereof is to move the blade more firmly in its seat. Figs. 5, 6, and 7 to 10 are detail views of a cutter of the type in which a portion of the cut is taken by both cutting edges of the blade, and in this case it is more desirable to provide a compoundly tapered blade and blade opening so that the resultant of the tapers extends in a direction substantially parallel to the component of the two cutting forces.

In Figures 7 to 10 serrations and ribs and grooves have been illustrated extending in transverse directions to effect desired range and direction of adjustments together with the locking effects herein above mentioned.

Figure 12:
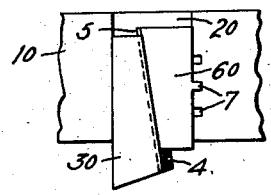
Figure 15:
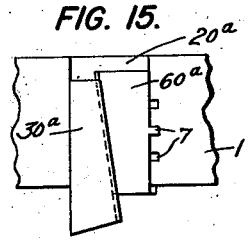
Figure 11:
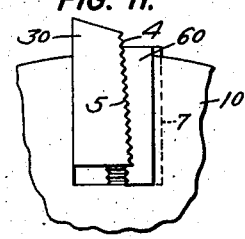
Figure 13:
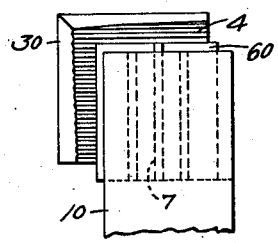
Figure 14:
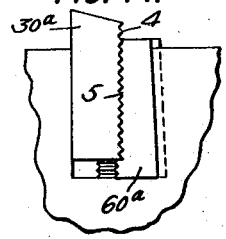

Figs. 11, 12 and 13 illustrate a double tapered construction in which one of the tapers is inverted so as to form a dovetailed opening. Fig. 13 illustrates one arrangement or position the serrations or locking means may assume. Figs. 14 and 15 depict a similar form of construction except that one wall of the opening in the holder member is inclined and in which a single tapered blade and a double tapered locking piece is employed which together form a unit having but a single taper fitting a dovetailed opening.

Figure 17:
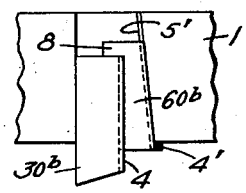
Figure 16:
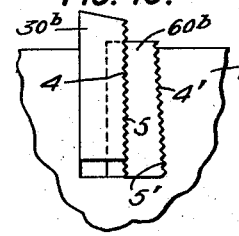

Figs. 16 and 17 represent a construction employing a rectangular shaped blade and a double tapered and serrated locking piece with single adjustments of the blade being effected by stepping the blade over one or more serrations, and double adjustment being effected by stepping the locking piece over one or more serrations.

Figure 18:
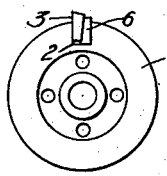
Figure 19:
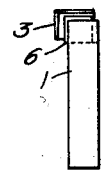
Figure 20:
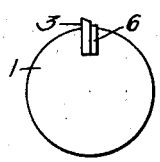
Figure 21:
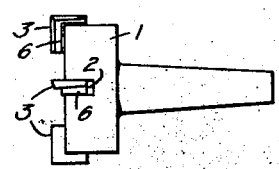
Figure 22:
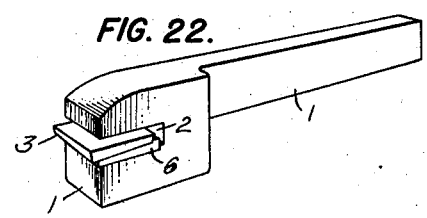

Figs. 18-22 are diagrammatic figures of representative tools embodying principles of this invention, Fig. 18 representing a face view of a milling cutter; Fig. 19 a side view thereof; Fig. 20 an end view of an end mill; Fig. 21 a side view thereof and Fig. 22 a perspective view of a lathe tool.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views.

The invention as incorporated in the type of cutters illustrated in Figs. 1 to 4 includes a body member 1 having one or more openings 2 formed therein for the reception of the blade members 3. The openings and blades are, as shown, tapered in one direction and preferably in the direction as to effect a more firm and rigid seating of the blade under normal tooling operations. Figs. 1 and 2 illustrate the blade and slot having parallel side walls axially of the tool but which converge radialy toward the center of rotation, while Figs. 3 and 4 illustrate a type of cutter such as a face mill and in which the cutting is done at the side or face thereof. In this construction the taper of the blade extends in the general direction of the axis of the tool so that the impacts of the cutting forces tend to drive the blade inwardly and thus more firmly in its seat. Interlocking means such as the serrations 4 and 5 are provided between the blade and lock piece 6 to lock the blade against turning movements and also to permit lateral adjustment thereof in a direction transverse to the direction of the serrations.

Figure 7:
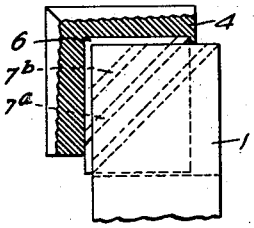
Figure 8:
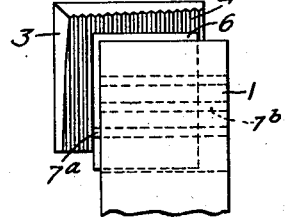
Figure 9:
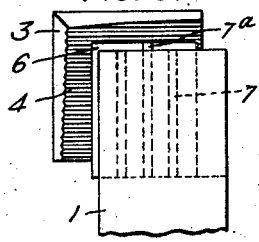
Figure 10:
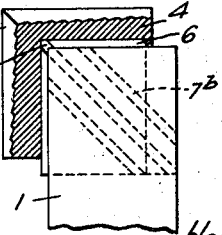

Referring now to Figures 5 to 10, a rotary type of cutter is illustrated in which the body member 1 is provided with an opening 2 for the reception of a compoundly tapered blade member 3. With such a tool cutting is done upon the face thereof and also at the periphery and with a compound taper, such as that illustrated, the normal cutting forces in both directions tend to seat the blade more firmly. In this construction the serrations 4 and 5 may extend axially of the tool, such as illustrated in Fig. 9, or radially as shown in Fig. 8, or diagonally as shown in Figs. 7 and 10, as desired. The blade member 3 is provided with a taper of approximately 3° extending radially of the tool and also the locking piece, the two tapers being reversed such that when the two pieces are combined they conform to the shape of the opening in the body member. Serrations 4 and 5 are provided between the locking piece and the blade to permit relative lateral adjustment therebetween, while interengaging means 7 are provided between the locking piece 6 and the body member 1 to prevent lateral movements between these members. In assembling such a cutter the locking piece 6 is first inserted in the opening and the blade member 3 next driven in place. In the face mill type of tool, such as that shown in Figs. 3 and 4, the taper of the blade and the serrations extend axially of the tool, and interlocking means 7 between the element 6 and body member 1 extending in a direction transverse to the direction of the taper and serrations. In this way means are provided positively to lock the element 6 against movement when the blade 3 is driven in from the end. This construction has the further advantage in that it permits a repositioning of the blade to compensate for wear in two directions, i. e. the blade may be moved outwardly radialy one or more serrations and again driven in place, or the locking piece 6 may be moved endwise in the opening 2 and thus, in effect, move the blade seat axially of the cutter body. A single or double adjustment may, in this manner, be given to the blade without the use of auxiliary locking pins, shims, etc.

In the construction shown by Figs. 5 to 10 wherein a composite unit is employed, it is to be remembered that the blade member is compoundly tapered, i. e. radially and axially (approximately 3° and 6° respectively) and the locking piece 6 is also similarly tapered but in the reverse directions, the two pieces together forming a unit having a shape conforming to the shape of the opening 2 in the body member 1. As hereinbefore stated the serrations or interlocking means between blade and lock piece may extend axially, radially or diagonally with respect to the axis of the tool; likewise the interlocking means 7 between the lock piece 6 and body member 1 may extend in a radial, axial or diagonal direction but in all cases it is preferable to have the two sets of interlocking devices between the members extend in transverse directions (see Figs. 7 to 10) so that in the absence of other means, the one series locks the other.

Referring to Fig. 7 it will be noted that the blade member 3 may be readjusted one or more serrations with respect to the locking piece in either direction and thus change the diameter of the cutter or the axial position of the blades with respect thereto. However, in such a construction, where both series of interlocking means extend diagonally with respect to the major and minor axes of the tool, it is possible to effect a combined radial and axial adjustment of the blade member with but a single re-positioning thereof. The interlocking means 7, between the element 6 and body member 1, in the present case, comprise a rib member 7a formed on the lock piece, which is adapted to interfit complementary formed slots 7b formed in the body member and by adjusting the lock piece 6 outwardly one or more slots and then re-inserting the blade it will be observed that the cutting edges thereof will be advanced simultaneously in two directions. The moving of the locking piece diagonally has the effect of reducing the dimensions of the double tapered opening remaining between the forward face of the locking piece and the wall of the holder 1. Hence, when the blade member 3 is re-inserted therein the same cannot be driven quite so far inwardly and the blade will be caused to project a greater or lesser degree depending upon the spacing of the diagonal slots.

In each of the foregoing constructions it will be noted that the taper on the blade member, whether it is a single taper or a double taper, extends or converges in a direction away from the cutting edges of the blade. However, it is also possible to reverse the direction of one or more of the tapers without sacrificing the firmness of the blade lock or the rigidity of the completely assembled tool. Considerable difficulty is experienced in accurately machining the serrations or interlocking devices upon the inclined wall of the body member and especially so if they are to extend at an angle with, or perpendicular to, the length of the slot therein.

The present invention overcomes this problem by forming the serrations upon a separate element and attaching same to the cutter body. This improved construction is depicted in Figs. 11, 12 and 13 which illustrate the body member 10 provided with rectangularly shaped opening 20 which is adapted to receive a composite unit comprising the blade member 30 and lock piece 60. With reference to Fig. 11, it will be noted that the blade member is provided with a dove-tailed taper extending radially of the cutter body and is also wedge-shaped axially of the body as shown in Fig. 12. The locking piece 60 is likewise provided with a double taper forming the counter-part of the tapers on the blade so that the two pieces when placed together will conform to the shape of the opening 20. In assembling such a device the locking piece 60 is first inserted in the opening and thereafter the blade member 30 is driven into position, the axial taper on the blade acting as a wedge to secure both elements firmly in position. As hereinbefore stated in connection with Figs. 7 to 10, serrations or interlocking devices 4, 5 and 7 are provided between the various members for effecting a rigid lock, as well as a means whereby the blade and lock piece may be guided and adjusted relative to each other and/or to the body member 10.

The interengaging means 7 between the locking member and the cutter body and between the locking member and the blade member are shown in Fig. 13 as extending in directions transverse to each other. They may, of course, extend in parallel directions according to the particular design of blade lock desired.

Another form of blade lock incorporating the principles of the wedge is that illustrated in Figs. 14 and 15. In this type of construction the side walls of opening 20a in the body member are inclined toward each other so as to provide a dove-tailed opening in a sectional plane perpendicular to the axis of the cutter, but are parallel in an axial direction, that is, lengthwise of the holder. With this construction a single tapered blade 30a may be employed in conjunction with a double tapered locking piece 60a as shown, or a double tapered blade (dove-tailed radially) and a single tapered locking piece. With this latter construction, it will be seen, a compound adjustment may be given to the blade merely by stepping same outwardly one or more serrations as hereinbefore set forth.

Figs. 16 and 17 illustrate one form of blade lock in which serrations are formed upon both sides of the lock piece and extend in the same general direction. With this construction a rectangularly shaped blade 30b may be used and to insure that the blade will not be moved inwardly under load, a ledge portion 8, formed integral with the lock piece 60b, engages the rear thereof and serves as a positive abutment. Any forces tending to move the blade in that direction are thereby transmitted to the lock piece and since this latter element is wedge-shaped in that direction the resultant effect of the load upon the blade is to move the lock piece in a direction impinging the blade more firmly.

The interengaging means formed upon the several members are so positioned with respect to each other that the blade member may be advanced selectively radially or axially of the cutter body, or to a position which is a combined radial and axial readjustment, e. g. stepping the blade over one or more of the serrations 4, 5, effects readjustment thereof in one direction, by stepping the composite unit (blade and lock piece) over one or more serrations 4', 5' a compound or combined radial and axial repositioning of the blade is effected; and by advancing the lock piece one or more serrations 4', 5' and dropping the blade back a proportionate amount a repositioning of the blade axially of the holder may be effected with little or no radial movement. Such a construction, it will be observed, embodies all the advantages in the way of single and/or compound adjustments of the devices hereinabove explained in addition to the advantages gained in that a rectangularly shaped blade is more easily constructed from the hard metal alloys than a tapered blade. The lock piece 60b and body member 1 being of relatively softer materials can be given the desired tapers without difficulty.

The herein described blade locks represent but a few of the designs capable of being devised, each of which employ principles of the wedge. The several tapered elements cooperating with one another and/or in conjunction with the positive interengaging means, affords an arrangement which secures the blades in a rigid manner comparable only to a solid tooth cutter, in addition to the advantages that the parts are interchangeable and inexpensive to replace and provide a wide range of single and/or compound adjustments of the blades.

In practice it will be found that the degree of taper given to the various faces of the blades, lock pieces and blade apertures need not be very great. It has been found however that a 2 to 6 degree angle of inclination of the faces will effect an eminently strong and tight blade lock while at the same time permitting easy removal of the blade when readjustment is required.

It is to be understood that the terms "axially" and "radially" hereinabove used are intended to include slots in the holder member arranged in known manner at an angle to the radial line and the longitudinal axis of the cutter in order to give proper rake angle to the blades.

Without going into further description of details of refinement and other adaptations of this invention the foregoing so fully reveals the gist of the invention that others can by applying current knowledge and by retaining one or more of the features hereinabove set forth or modifications thereof, readily adapt it to meet various uses or requirements without departing from the spirit or generic aspects of the present invention.

Having thus revealed this invention, I claim as new and desire to secure the following combinations and elements, or equivalents thereof, by Letters Patent of United States:—

1. An insertable blade metal cutting tool of the character described combining a holder member having a blade opening formed therein, one of the walls of said opening being provided with a series of grooves; a composite blade unit adapted to fit within said opening comprising a blade member with two angularly disposed intersecting cutting edges, one side of which is plain and the other side of which is provided with a series of parallel serrations, and a locking member, one side of which is provided with serrations adapted to interengage with the serrations on the adjacent side of said blade, and the other side of said locking member having a rib thereon extending in a direction transversely to said serrations and adapted for selective engagement with one of the grooves in the wall of the opening in the holder member; one of the members of said composite unit being provided with compoundly inclined side walls thereby forming a diagonally tapered element adapted to coact with the other member of said unit whereby the unit may be wedged firmly in said opening, said serrations and interengaging rib and groove means extending in a direction respectively parallel and perpendicular to the direction of the taper formed upon one of said members so that the said blade member may be adjusted relatively to said holder member selectively in either of two directions outwardly from said holder or said blade member and lock piece may be adjusted with respect to the holder member in both directions simultaneously, the cutting forces acting upon said blade tending to wedge the blade more firmly in clamped position.

2. A cutter tool of the insertable blade type combining a supporting body having a blade opening formed therein; a blade member having one side plain and the other side thereof serrated and a locking member adapted for insertion in said opening, one of said members being compoundly diagonally tapered with respect to the other and, when arranged adjacent the other member, the two together conforming to the shape of the blade opening; means on the locking member extending in a direction transverse to the taper and cooperating with a plurality of complemental means on the adjacent wall of said opening adapted positively to lock said locking member in any one of a plurality of positions therein; and locking means provided by said locking member extending in the direction of the said taper engageable with complemental means on said blade member to maintain the blade in any one of a plurality of adjusted positions with respect to said locking member, said last mentioned means permitting said blade to move relative to the locking member in a direction of clamping under the reactionary pressures of the tooling forces thereon.

HAROLD F. SCRIBNER.